May 5, 1970 A. J. MORTIMER 3,510,743
LOAD SENSING AND COMPENSATING CONTROL CIRCUITS
Filed Aug. 14, 1967

INVENTOR
AUSTIN J. MORTIMER

BY Edward J. Norton
ATTORNEY

United States Patent Office 3,510,743
Patented May 5, 1970

3,510,743
LOAD SENSING AND COMPENSATING CONTROL CIRCUITS
Austin J. Mortimer, Oldwick, N.J., assignor to RCA Corporation, a corporation of Delaware
Filed Aug. 14, 1967, Ser. No. 660,373
Int. Cl. H02p 5/16
U.S. Cl. 318—332                               7 Claims

ABSTRACT OF THE DISCLOSURE

There is disclosed a load sensing and compensating control circuit for use primarily with a motor driven load wherein changes in the power requirements of the load are automatically compensated for by increasing the power supplied to the input terminals of the load. The circuit utilizes a silicon controlled rectifier, variable time delay means for determining the conduction angle of the rectifier, and a feedback element, wherein changes in the power requirements of the load are sensed by the feedback element which then operates to effect the performance of the variable time delay means used to trigger the rectifier in a manner whereby the conduction angle of the rectifier is advanced or retarded.

Background of the invention

It is often desirable in the operation of motor driven devices to assure constant speed at the output shaft of the driving motor so that the performance of the mechanical load being driven can be maintained at a constant level. This is particularly true in the case of household appliances such as blenders, mixers, or electric can openers. The motors of such appliances have a tendency to be put under greater load for limited periods of time while the appliance is accomplishing the desired result and to remain in operation after the torque requirements of the motor driving the load have been substantially reduced. This often results in an undesirable "speed up" in the operation of the appliance after the desired result has been accomplished. Additional examples wherein this problem arises include power driven tools such as band saws, electric drills, buffers, and sanders.

Accordingly it is an object of the present invention to provide an improved circuit for supplying power to a motor driven load whereby the operation of the load can be maintained despite variations in torque requirements.

A further object is to provide an improved circuit for supplying power to a driven load which is self-regulating and which will continue to operate and automatically compensate for variations in load requirements so as to maintain performance constant.

Summary of the invention

In accordance with one embodiment of this invention the anode and cathode of a silicon controlled rectifier (SCR) are connected in series with a motor driven load through a feedback resistance and across a pair of input terminals to which a source of alternating current may be connected. A variable time delay circuit for determining the conduction angle of the SCR is connected between the anode of the rectifier and the feedback resistance element, and further connected to the control electrode of the SCR. The operation of the circuit is such that when the load to be supplied is essentially constant the variable time delay circuit will maintain a fixed conduction angle at which the SCR will switch from its nonconducting to its conducting state during every positive half cycle of alternating current supplied. In the event of a variation in the power requirements of the load, the instantaneous increase of current flowing through the feedback resistance will cause the variable time delay circuit to adjust the conduction angle of the SCR during successive positive half cycles of alternating current thereby permitting the current to automatically supply the power then required by the load on a steady state basis.

Description of the figures and preferred embodiments

Figure 1:
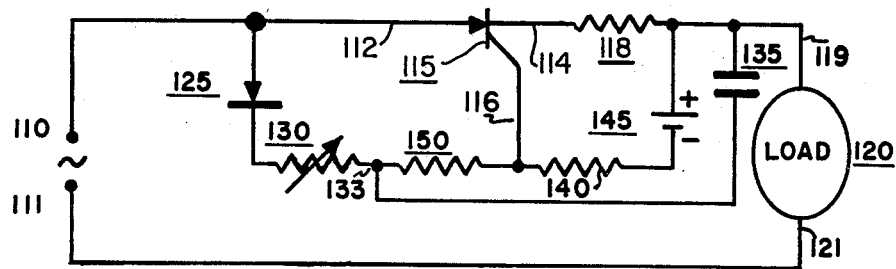
Figure 2:
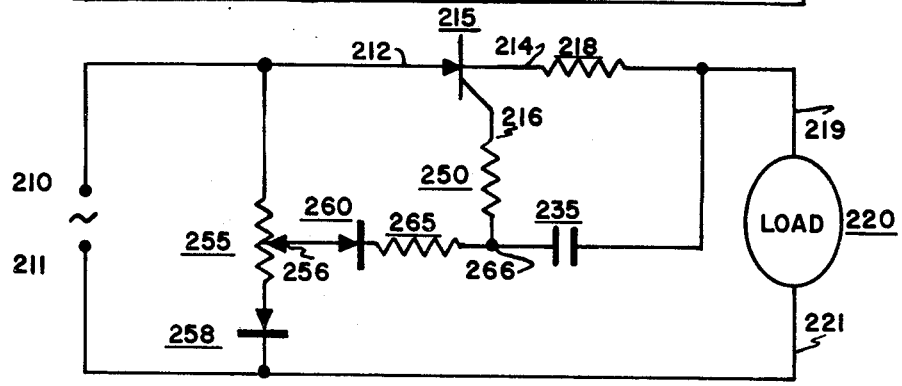
Figure 3:
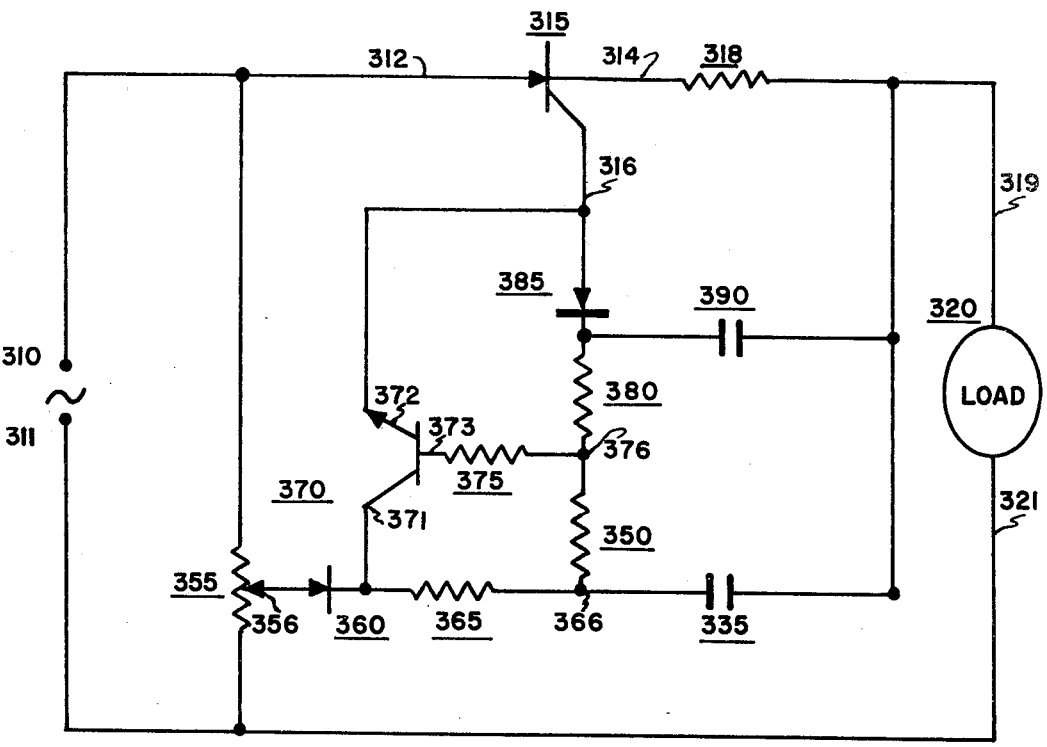

The present invention will be more fully understood when the following description is read in conjunction with the accompanying drawing in which FIGS. 1, 2 and 3 are circuit diagrams of three embodiments of the present invention.

As shown in FIG. 1, one terminal 110 of an alternating current supply is connected to the anode 112 of a silicon controlled rectifier (SCR) 115. The cathode 114 of the SCR 115 is connected through a feedback element 118 to one terminal 119 of the load 120 to be served. The second terminal 121 of the load 120 is connected to the second terminal 111 of the alternating current supply. A diode 125, a variable resistance element 130, and a capacitor 135 are connected in series in the order named between the anode 112 of the SCR 115, and terminal 119 of the load 120, the diode 125 being poled to conduct conventional current toward terminal 119. To prevent the occurrence of damage to the SCR 115 the variable resistance element 130 should have a minimum resistive setting appreciably above zero; e.g., 10 kilohms. A resistor 140 and a biasing battery 145 are connected in series between the gate (control) electrode 116 of the SCR 115 and terminal 119 of the load 120 with terminal 119 being connected directly to the positive terminal of the battery 145. A resistor 150 is connected between the gate electrode 116 of the SCR 115 and the junction 133 of the variable resistance element 130 and the capacitor 135.

Referring now to the operation of the circuit described in FIG. 1, when the polarity of the supply voltage at terminal 110 becomes positive with respect to terminal 111 the SCR 115 is placed in a forward biased condition, i.e., the potential at its anode 112 being positive with respect to the potential at its cathode 114, and the SCR 115 is primed to be switched into conduction upon the application of a triggering signal to the gate 116. This triggering signal is supplied via the diode 125, the variable resistance element 130, and the resistor 150.

Initially the value of the variable resistance device 130 is set toward its upper limit so as to prevent the SCR 115 from being triggered into conduction. As the resistance of the element 130 is decreased, the capacitor 135 is permitted to charge during positive half cycles (i.e., terminal 110 positive with respect to terminal 111) through diode 125, resistance element 130, and the load 120, as a function of line voltage. When the voltage attained as a result of the charge on the capacitor 135, as seen by the gate electrode 116 through resistor 150, sufficiently exceeds the voltage of the backbiasing battery 145, as seen by the gate electrode 116 through resistor 140, the SCR 115 will be triggered into conduction and will remain in a conducting state for the duration of the positive half cycle. To insure smooth operation of the load the resistance of element 130 should be decreased slowly so as to permit the capacitor 135 to charge during a few half cycles of positive power prior to attaining firing potential.

When terminal 110 swings negative with respect to terminal 111 both SCR 115 and diode 125 are reverse biased and nonconducting, and capacitor 135 will begin to discharge through resistors 150, 140, and 118. It should be noted that an internal conductive path exists within the SCR 115 between the gate 116 and cathode 114 even when the SCR is in a nonconducting state.

When the SCR 115 is in its conducting state, capacitor 135 will continue to change essentially as a function of the voltage drop existing across the feedback element 118. Once the load attains steady state operation the capacitor 135 will continually charge to a normal maximum level during periods of SCR conduction, and continually discharge to a normal minimum level during periods of SCR nonconduction, the conduction angle at which the SCR will fire during subsequent positive half cycles being dependent upon this minimum level. Should the power requirements of the load suddenly change, increase for example, the current flow through the SCR 115 and the feedback element 118 instantaneously increases to meet this new requirement. This increase in current flow results in a greater voltage drop across the feedback element 118 and consequently will cause the capacitor 135 to charge to a level greater than the normal maximum. Thereafter, during the discharge period (i.e. the negative half cycle of A.C. supply), the capacitor 135 does not discharge to its normal minimum level and, as a result, conduction during the subsequent positive half cycle of A.C. supply occurs earlier during the cycle thereby resulting in the application of a larger voltage to the load 120 to compensate for the increased power requirements. Conversely, should the power requirements of the load decrease, the current flowing through SCR 115 and the feedback element 118 instantaneously decreases, thereby, resulting in a decrease in the voltage drop across element 118. This prevents capacitor 135 from charging to its normal maximum level and results in its discharge, during the negative half cycle, to a value lower that its normal minimum level. As a result, subsequent conduction occurs later during the following positive half cycle, i.e., the conduction angle is decreased, due to the increased amount of charge which the capacitor 135 first requires prior to triggering the SCR 115 into conduction.

Experimentation has shown that the circuit described in FIG. 1 will operate satisfactorily without the inclusion of resistor 140 and biasing battery 145 although a decrease in smoothness was noted. It should be further noted that in the circiut of FIG. 1, the SCR and associated circuit means are connected in series with the load thereby obviating the often cumbersome requirement of making connections directly across the terminals of the load.

In the embodiment of FIG. 2, one terminal 210 of an alternating current supply is connected to the anode 212 of SCR 215. The cathode 214 of the SCR 215 is connected through a feedback element 218 to one terminal 219 of the load 220 to be served. The second terminal 221 of the load 220 is connected to the second terminal 211 of the alternating current supply. A variable resistance device 255, such as a slide potentiometer, is connected in series with a diode 258 in the order described across the terminals 210, 211 of the alternating current supply, the diode 258 being poled to conduct conventional current toward terminal 211. A second diode 260, a resistor 265, and a capacitor 235 are connected in series in the order named between the pickoff arm 256 of the potentiometer 255 and terminal 219 of the load 220, the diode 260 being poled to conduct conventional current away from the pickoff arm 256. A resistor 250 is connected between the gate electrode 216 of the SCR 215 and the junction 266 of the resistor 265 and the capacitor 235.

In the operation of the cricuit of FIG. 2, the SCR 215 and the diode 260 are forward biased during positive half cycles of A.C. supply; i.e., when terminal 210 is positive with respect to terminal 211. As the resistance of potentiometer 255 is decreased the capacitor 235 begins to charge through potentiometer 255, diode 260, resistor 265, and the load 220, as a function of line voltage. When the voltage on the capacitor 235 attains a level sufficient to supply a triggering signal to the control electrode 216 of the SCR 215 via resistor 250, the SCR 215 will switch into a conducting state and continue to conduct for the remaining portion of the positive half cycle of A.C. supply. During such time the capacitor 235 will charge essentially as a function of the voltage drop across the feedback element 218. Changes in the power requirements of the load 220 will be reflected upon the charge of the capacitor 235 via the feedback element 218 as in the case of the circuit of FIG. 1.

Diode 260 provides assurance against the leakage of charge from capacitor 235 via resistor 265 during negative half cycles of the A.C. supply. The presence of diode 258 assures that the potential on the pickoff arm 256 of the potentiometer 255 will never fall to ground potential thereby permitting smooth operation over a wide band of resistive settings. The minimum setting of potentiometer 255 should be so selected as to insure against the occurence of damage to the SCR.

Referring now to the embodiment shown in FIG. 3, one terminal 310 of an alternating current supply is connected to the anode 312 of a silicon controlled rectifier 315. The cathode 314 of the SCR 315 is connected through a feedback element 318 to one terminal 319 of the load 320 to be served. The second terminal 321 of the load 320 is connected to the second terminal 311 of the alternating current supply. A variable resistance device 355, such as a slide potentiometer, is connected between the terminals 310, 311 of the alternating current supply. A first diode 360, a first resistor 365 and a first capacitor 335 are connected in series in the order named between the pickoff arm 356 of the potentiometer 355 and terminal 319 of the load 320, the diode 360 being poled to conduct conventional current away from pickoff arm 356. A second diode 385 and a second capacitor 390 are connected in series in the order named between the gate electrode 316 of SCR 315 and terminal 319 of the load 320, the diode 385 being poled to conduct conventional current away from the gate 316. A resistor 350 and a resistor 380 are connected in series in the order named between the junction 366 of resistor 365 and capacitor 335, and the cathode of diode 385. An NPN transistor 370 is included in the circuit as follows: the transistor collector 371 is connected to the cathode of diode 360; the transistor emitter 372 is connected to the gate 316 of the SCR 315, the transistor base 373 is connected through a resistor 375 to the junction 376 of resistors 350 and 380.

Referring now to the operation of the embodiment shown in FIG. 3, during the positive half cycle of A.C. supply capacitor 335 will charge through the potentiometer 355, diode 360, resistor 365, and the load 320, as a function of line voltage. Capacitor 390 will charge, to a lesser extent through the potentiometer 355, diode 360, resistors 365, 350, 380, and the load 320. When the voltage drop across resistors 365 and 350 attains a level sufficient to forward bias the collector to base portion of transistor 370, a triggering signal will be supplied to the gate 316 of the SCR 315 via the diode 360 and the collector to emitter path of the transistor 370 causing the SCR 315 to become conductive and remain in that state for the duration of the positive half cycle of the A.C. supply. Upon conduction in the positive half cycle, the SCR 315 serves essentially as a closed switch for supplying power directly to the load 320 through the feedback element 318. While the SCR 315 is conducting, capacitor 390 charges as a function of the voltage drop across the feedback element 318 via diode 385. Similarly capacitor 335 will charge as a function of the voltage drop across the feedback element 318 via diode 385 and resistors 380 and 350. The charge upon capacitor 335 will be significantly less than the charge attained by capacitor 390 because of the additional voltage drop occurring across resistors 380 and 350.

During the negative half cycle of A.C. supply capacitors 335 and 390 will essentially retain their dissimilar charges. When the A.C. supply swings positive again, the charge on capacitor 390 tends to back-bias the transistor 370 thereby preventing it from becoming conductive until such time that the charges on the two capacitors 335 and 390 become equal. At such time, the transistor 370 will once again conduct and the cycle will be repeated. Variations in the power requirements of the load 320 will effect the voltage drop across the feedback element 318 accordingly thereby resulting in variations of charge upon the capacitors 335 and 390, the variations consequently effecting the conduction angle of the SCR 315 during subsequent positive half cycles.

By a proper selection of resistors 350 and 380 there results a minimization of any tendency which the system may have to hunt or over-compensate for changes in loading. Resistors 350 and 380 may of course be replaced by a potentiometer.

It should be noted with respect to FIG. 3 that although the anode of diode 385 has been shown connected directly to the gate 316 of SCR 315 the circuit will operate with equal satisfaction if instead the anode is connected to the cathode 314 of the SCR. The requirement of connecting the terminals of potentiometer 355 across the line is necessitated in those cases where low voltage transistors are used to assure protection to the transistor against damage resulting from high line voltage. The use of a high voltage transistor would permit the use of a variable resistance element connected directly in series with diode 360 and would obviate the need for connecting the control circuit across the load.

What is claimed is:

1. A two terminal load sensing and copensating circuit for controlling the supply of power to a motor driven variable load comprising:
   (a) a silicon control rectifier having an anode, a cathode and a control electrode;
   (b) a first input terminal and a second input terminal adapted for connection to a source of alternating current, said first input terminal being connected to one terminal of said load, said second input terminal being connected to said anode;
   (c) a feedback element connected between said cathode and the second terminal of said load;
   (d) a transistor having base, collector and emitter electrodes;
   (e) a potentiometer having two fixed terminals and a variable tap-terminal, said fixed terminals being connected between said first and second input terminals;
   (f) a first diode, a first resistor, and a first capacitor connected in series in the order named with the anode of said first diode being connected to said variable tap terminal and said first capacitor being connected to said second terminal of said load;
   (g) a second diode in series with a second capacitor, the anode of said second diode being connected to said control electrode and said second capacitor being connected to said second terminal of said load;
   (h) a second and a third resistor connected in series between the cathode of said second diode and the junction of said first resistor and said first capacitor; and
   (i) a fourth resistor connected between the junction of said second and third resistors and the base of said transistor, the collector of said transistor being connected to the cathode of said first diode and the emitter of said transistor being connected to said control electrode.

2. A two terminal load sensing and compensating circuit for controlling the supply of power to a motor driven variable load comprising:
   (a) a silicon controlled rectifier having an anode, a cathode and a control electrode;
   (b) a first input terminal and a second input terminal adapted for connection to a source of alternating current, said first input terminal being connected to said anode, said second input terminal being connected to one terminal of said load;
   (c) a feedback element connected between said cathode and the second terminal of said load;
   (d) triggering means coupled to said control electrode;
   (e) variable time delay means coupled to said silicon controlled rectifier, said feedback element, and said triggering means for providing a triggering signal to said control electrode via said triggering means at a desired instant of time at which said silicon controlled rectifier is switched into a conducting state to supply the requisite power requirements to said load therethrough,
   said variable time delay means comprising a variable resistance element in series with a capacitive element, said series combination connected on its resistive side to said anode and on its capacitive side to said second terminal of said load, said triggering means being connected on one side to the junction between said resistance and said capacitive elements and on its other side to said control electrode; and
   (f) a resistor in series with a battery, said resistor connected to said control electrode, the positive terminal of said battery connected to said second terminal of said load.

3. A two terminal load sensing and compensating circuit for controlling the supply of power to a motor driven variable load comprising:
   (a) a silicon controlled rectifier having an anode, a cathode, and a control electrode;
   (b) first and second input terminals adapted for connection to a source of alternating current, the anode and cathode of said rectifier connected in series with said load between said input terminals;
   (c) a feedback element connected in series with said rectifier and said load; and
   (d) variable time delay means coupled to said rectifier and said feedback element, said variable time delay means including an RC time constant circuit for controlling the instant in time that a triggering signal sufficient to fire said rectifier into conduction is applied to said control electrode, said RC time constant circuit charging as a function of the voltage across said feedback element when said rectifier is in a conducting state, and discharging when said rectifier is in a non-conducting state, the conduction angle of said rectifier varying inversely as a function of the charge attained by said RC time constant circuit when said rectifier is conducting.

4. The invention as described in claim 2, further comprising biasing means connected in circuit with said variable time delay means, said biasing means poled to oppose the polarity of charge upon said time constant circuit.

5. A two terminal load sensing and compensating circuit for controlling the supply of power to a motor driven variable load comprising:
   (a) a silicon controlled rectifier having an anode, a cathode and a control electrode;
   (b) first and second input terminals adapted for connection to a source of alternating current, the anode and cathode of said rectifier connected in series with said load across said input terminals;
   (c) a feedback element connected in series with said rectifier and said load; and
   (d) variable time delay means coupled to said rectifier and said feedback element, said variable time delay means including an RC time constant circuit for controlling the instant in time that a triggering signal sufficient to first said rectifier into conduction is applied to said control electrode, said RC time constant circuit charging only when said rectifier is forward biased by said AC source, initially as a function of said AC source and subsequently, when said rectifier is in a conducting state, as a function of the voltage across said feedback element, said RC time constant circuit discharging through the control electrode-to-cathode path of said rectifier when said rectifier is reverse biased, the conduction angle of said rectifier varying inversely as a function of the charge attained by said RC time constant circuit when said rectifier is conducting.

6. A two terminal load sensing and compensating circuit for controlling the supply of power to a motor driven variable load comprising:
  (a) a silicon controlled rectifier having an anode, a cathode and a control electrode;
  (b) a first input terminal and a second input terminal adapted for connection to a source of alternating current, said first input terminal being connected to said anode, said second input terminal being connected to one terminal of said load;
  (c) a feedback element connected in series with said rectifier and said load;
  (d) a diode, a resistance element, and a capacitor connected in series, the anode of said diode coupled to the anode of said rectifier, said capacitor coupled to said second terminal of said load; and
  (e) a triggering element connected on one end to the junction formed by said resistance element and said capacitor, and on the other end to said control electrode, said capacitor charging when said rectifier is forward biased by said AC source, and discharging through the control electrode-to-cathode path of said rectifier when said rectifier is reverse biased by said AC source.

7. The invention as described in claim 6 further comprising biasing means connected in circuit with said capacitor, said biasing means poled to oppose the charge upon said capacitor.

References Cited

UNITED STATES PATENTS

| | | | |
|---|---|---|---|
| 2,554,695 | 5/1951 | Brown | 318—332 |
| 2,799,819 | 7/1957 | Brown | 318—332 |
| 3,165,688 | 1/1965 | Gutzwiller | 318—345 |
| 3,192,462 | 6/1965 | James | 318—345 |
| 3,222,583 | 12/1965 | Gutzwiller | 318—345 |
| 3,242,410 | 3/1966 | Cockrell | 318—345 |
| 3,316,472 | 4/1967 | Talyor | 318—345 |
| 3,349,309 | 10/1967 | Dannettell | 318—332 |

ORIS L. RADER, Primary Examiner

L. L. HEWITT, Assistant Examiner

U.S. Cl. X.R.

318—432

UNITED STATES PATENT OFFICE
CERTIFICATE OF CORRECTION

Patent No. 3,510,743            Dated May 5, 1970

Inventor(s) A. J. Mortimer

It is certified that error appears in the above-identified patent and that said Letters Patent are hereby corrected as shown below:

Column 3, line 2, correct "change" to read --charge--.

Column 5, line 29, correct "copensating" to read --compensating--.

Column 6, line 49, correct "2" to read --3--.

Column 6, line 69, correct "first" to read --fire--.

SIGNED AND SEALED
NOV 24 1970

(SEAL)
Attest:

Edward M. Fletcher, Jr.
Attesting Officer

WILLIAM E. SCHUYLER, JR.
Commissioner of Patents